United States Patent [19]

Cosentino et al.

[11] Patent Number: 4,724,154
[45] Date of Patent: Feb. 9, 1988

[54] ELECTROSTATIC DEPOSITION OF COATING MATERIALS

[76] Inventors: Roberto F. Cosentino, 20/7 Via Rucellai, I-Milan; Carlo M. Pensa, Via Piazzonaga 9, I-22050 Esino Lario, Province of Como, both of Italy

[21] Appl. No.: 917,081
[22] PCT Filed: Jan. 9, 1986
[86] PCT No.: PCT/GB86/00015
 § 371 Date: Nov. 7, 1986
 § 102(e) Date: Nov. 7, 1986
[87] PCT Pub. No.: WO86/03993
 PCT Pub. Date: Jul. 17, 1986

[30] Foreign Application Priority Data

Jan. 9, 1985 [GB] United Kingdom ............... 8500487
Jan. 14, 1985 [GB] United Kingdom ............... 8500844

[51] Int. Cl.⁴ .......................... B05B 5/08; B01J 2/00
[52] U.S. Cl. ........................... 427/27; 427/33; 118/303; 118/629
[58] Field of Search ............... 427/27, 33; 118/629, 118/303

[56] References Cited

U.S. PATENT DOCUMENTS

| 2,270,341 | 1/1942 | Ransburg | 91/86 |
| 2,334,648 | 11/1943 | Ransburg et al. | 427/33 |
| 3,240,212 | 3/1966 | Royster | 427/27 |
| 3,666,523 | 5/1972 | Nau | 117/33 |
| 4,116,163 | 9/1978 | Torelli | 118/303 |
| 4,243,696 | 1/1981 | Toth | 427/27 |

FOREIGN PATENT DOCUMENTS 18349 of 1908 United Kingdom ............... 118/303

Primary Examiner—Shrive P. Beck

[57] ABSTRACT

A method of and apparatus for the electrostatic application of a coating material on a product of either electrically conducting or non-conducting material. The product is caused to descend from a hopper (10) in free fall in the form of spaced curtains (28, 30) across two streams (40, 42) of electrostatically charged coating material directed laterally of the curtains from opposite sides thereof. The rate of flow and spacing of the curtains (28, 30) is adjustable (32, 14, 16, 18, 20, 22, 26) as required depending upon the nature of the product and the properties of the coating material. Charges of opposite polarity are applied respectively to the two streams with the result that an electrostatic charge opposite to that of a stream is imparted to that side of each of the two curtains towards which the stream is directed causing attraction between the coating material and the product. The uniformity of the applied coating is much improved as compared with conventional techniques.

15 Claims, 6 Drawing Figures

ELECTROSTATIC DEPOSITION OF COATING MATERIALS

The present invention relates to the electrostatic application of films on free flowing products such as pellets, granules, crystals or powders in the manufacturing processes used in the agricultural, chemical and pharmaceutical field. More particularly, the invention relates to a method of and apparatus for the electrostatic application of films or coatings on such products.

Various techniques for the electrostatic application of coating materials on free flowing products are known from EPA Nos. 0085149, 0127566 and 0148772.

EPA No. 0127376 discloses a method and apparatus for electrostatic application of a coating material to a non-conducting or poorly conductive product, wherein the product falls in a circular or cylindrical curtain around a linear electrode having a first polarity and is sprayed with finely divided spray of either liquid or powder coating material carrying a charge of opposite polarity.

One object of the present invention is to further improve the uniformity of an electrostatically applied coating, whether the product be of electrically conductive or of electrically non-conductive material.

According to the present invention we propose a method for electrostatic application of a coating material on a product to be coated which product may be either of electrically conducting or non-conducting material, comprising causing the product to descend in free fall in the form of spaced curtains across two streams of electrostatically charged coating material directed laterally of the curtains from opposite sides thereof, wherein the two streams are charged with opposite polarity and such that an electrostatic charge opposite to that of the stream is imparted to that side of each of the two curtains towards which the stream is directed causing attaction between the coating material and the product.

Also according to the present invention, we propose apparatus for electrostatic application of a coating material on a product to be coated which product may be of either electrically conducting or electrically non-conducting material comprising a feeding device from which in use, the product is caused to descend in free fall in the form of spaced curtains, two electrostatic spraying devices arranged below the feeding device to direct streams of electro-statically charged coating material laterally of the free falling curtains from opposite sides thereof, the spraying devices being adapted respectively for connection to high voltage sources of opposite polarity, whereby, in use, a different electrostatic charge is applied to each of the two streams of coating material and an electrostatic charge opposite to that of the stream is imparted to that side of each of the two curtains towards which the stream is directed causing attraction between the coating material and the product.

One embodiment of the apparatus according to the present invention comprises a hopper, for the product material and having spaced outlet openings, preferably straight, arranged such that, in use, the product material is caused to fall freely in the form of two parallel and equal curtains.

One or more electrostatic spraying devices such as atomiser(s) and/or diffuser(s) are arranged and orientated so as to direct a spray of electrostatically charged coating material across the whole width of the free falling product material curtains, from opposite sides thereof.

When an electrostatic charge of opposite sign is applied to the spraying devices between which the two curtains fall, an electric field is established the intensity of which depends upon the potential difference (typically in the range 70 to 100 Kv) applied to the devices and the distance between the electrodes thereof and the free falling curtains of product material.

Fall of the product in the form of two parallel curtains, symmetrically within the electric field, deforms the pattern of lines of force causing them to converge in the product.

Thus the system is similar to a plane condenser in which the two opposed atomisers with flat blades are the capacitor plates, the electric field between the plates depending upon the applied p.d. and the distance between the electrodes.

If the product material comprises electrically conductive substances, then within the electric field, the product material is subject to induction, while if they are non-conductive, the phenomenon involved is polarisation. In both cases, the surface charges imparted to the products in one or other of the curtains are of a sign opposite to that applied to the associated electrode or electrodes.

The mechanical attractions caused by the electric field acting toward the outside of both sides of the elements forming the curtains are equal, so that they give rise to a null force which does not modify the path along which they fall.

The particles of the film or coating material produced by the electrostatic spraying devices have the same charge as the corresponding atomisers from which they come.

The electrostatically charged liquid or diffused powder follow the lines of force created between the opposed electrodes and are attracted by the surfaces of opposite sign of the falling products.

The particles of coating materials passing through the first product curtains, coat the elements in the second curtain which are also charged with a sign opposite to that of the particles atomised from the same side.

The distance between curtains and the distance at which the atomisers/diffusers are located, may be varied as required depending upon the kind of product to be processed and the chemical-physical properties of the coating substances.

The apparatus of the present invention is adapted for treating both particulate and liquid substances.

In case of powders, diffusers arranged outside the curtains may be single or serially related, mounted on brackets and articulated or rotary joints so as to be adjustable to any desired position and/or angle of incidence relative to the product fall path.

This system allows for use either atomisers with corona effect or induction atomisers or others, such as nozzles and hydraulic atomisers operating with air or rotary disc. In the latter case, rotary discs are contained inside atomisation housings adapted to develop atomised stream with a desired angle instead of 360 degrees.

Embodiments of the present invention will now be decribed by way of example with reference to the accompanying drawings in which:

FIG. 1 is a schematic cross-sectional view of electrostatic coating apparatus according to the invention;

Figure 1:
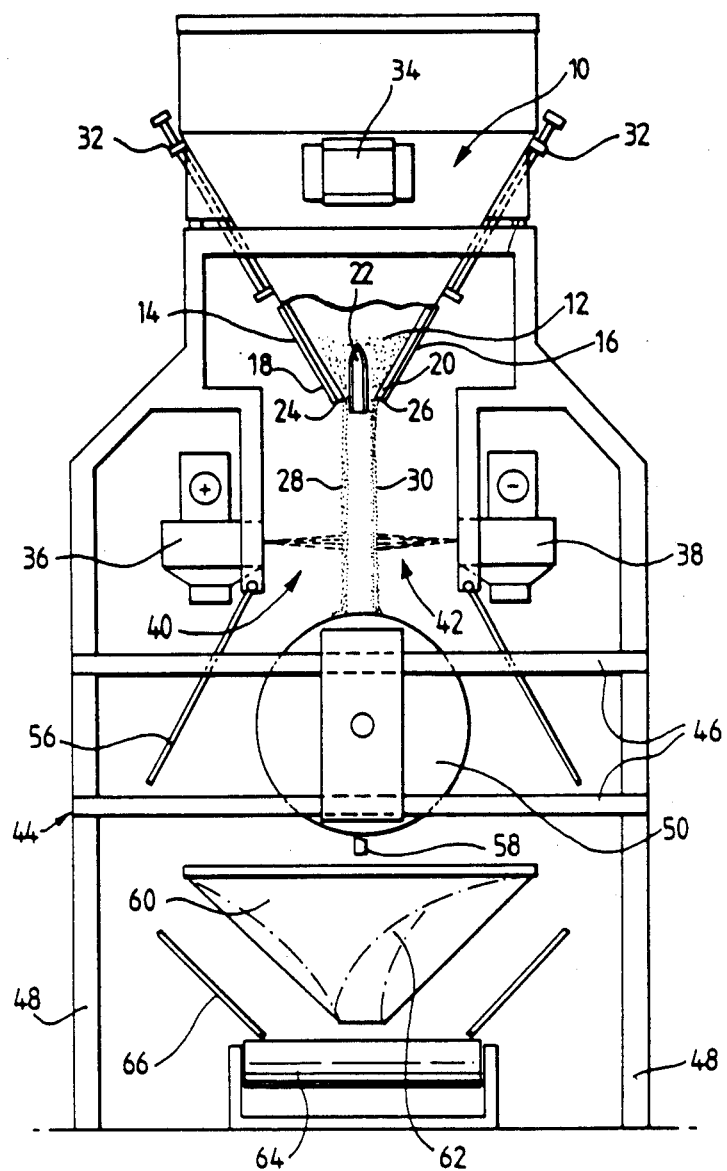
Figure 2:
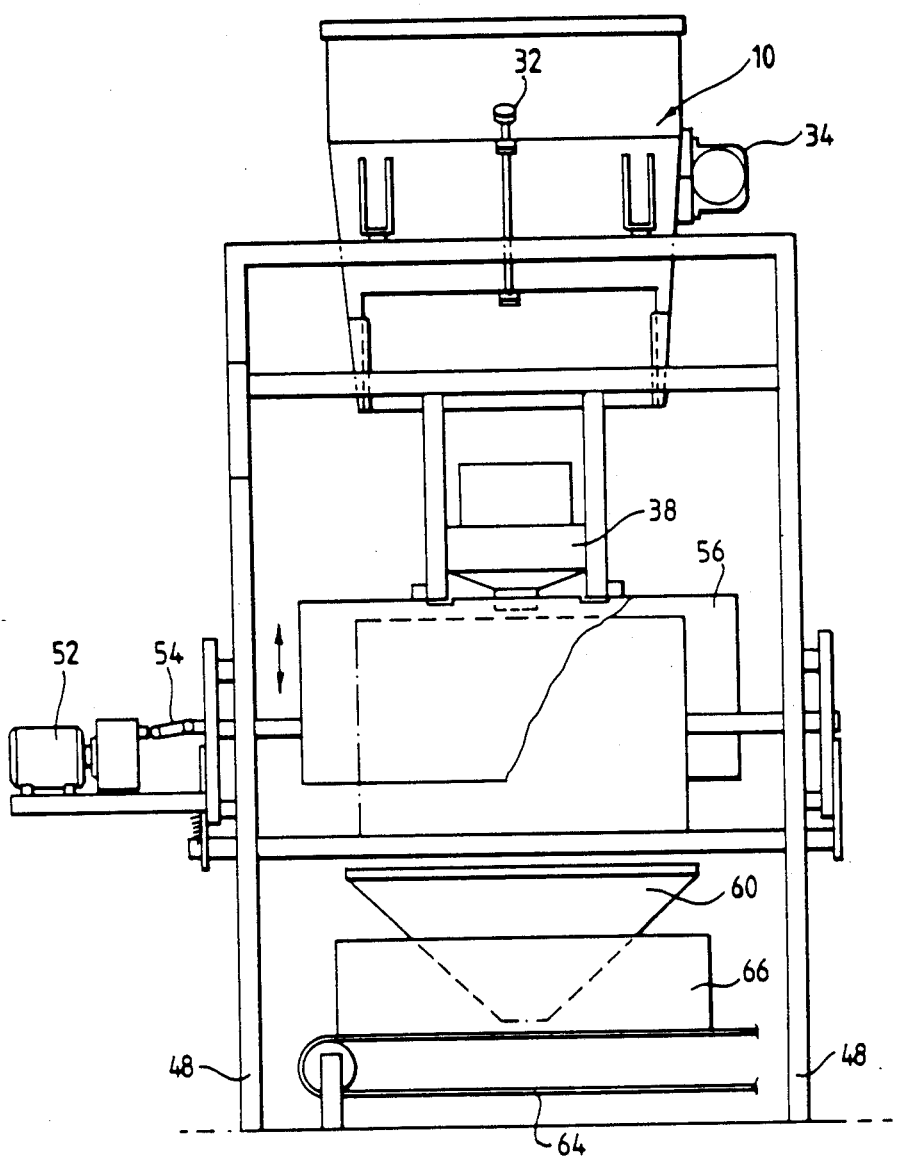
FIG. 2 is a schematic side elevation of the apparatus shown in FIG. 1.

The electrostatic coating apparatus of FIGS. 1 and 2 comprises a delivery hopper for the product 12 to be coated, having side plates 14 and 16 the lower edges 18,20 of which lie adjacent a spacer bar 22 to define on each side thereof an outlet slot 24,26. The product is discharged from the hopper through these slots to fall freely in the form of two parallel, closely spaced laminar curtains 28 and 30. Each side plate 14 and 16 is movable by means of a worm screw mechanism 32 to vary the width of the slot enabling adjustment of the thickness of each curtain according to the nature of the product, the degree of coating required, etc. Although not illustrated, it will be understood that the spacing between the curtains 28,30 may also be made adjustable by providing a downwardly tapering spacer bar which is mounted for displacement vertically to retract or extend the lower tapered edge thereof through the gap between the lower edges of the plates 14 and 16.

A vibrator device 34 is provided in the hopper to break down any lumps that may hinder passage of the product through the slots so ensuring a smooth discharge of finely divided product from the hopper.

Two electrostatic spraying devices 36,38 which may be liquid atomisers or powder diffusers, are mounted opposite one another and arranged to direct electrostatically charged streams 40,42 of coating or film forming material in opposite directions laterally of the free falling product curtains 28,30. The spraying devices 36,38 are connected respectively to high voltage sources of opposite polarity; the device to the left-hand side of the falling curtains having positive polarity and the right-hand device having negative plurality. As a result, the mutually opposed streams produced by the spraying devices carry corresponding positive and negative charges.

The hopper 10 and the atomisers 36 and 38 are supported by a steel frame 44 which is laterally strengthened by braces 46 to withstand the stress put on the frame legs 48 by the weight of the entire structure and of the product and by the vibrations caused by the vibrator device 34.

Inside the frame 44 and disposed in the path of the free falling product curtains is a rotary drum 50, driven by variable speed motor 52. The motor 52 is connected for driving the drum 50 by a shaft incorporating a universal joint 54 enabling position of the drum 50 to be adjusted in order to vary the earth effect.

Hinged beneath the atomiser/diffuser supporting structure on opposite sides of the drum 50 are metal baffles 56 which avoid spreading of the film forming substance. The drum 50 acts to (electrically) discharge the coated product this being desirable particularly in the case of electrically conductive product particles. Should any charge remain or if for any other reason the coated product material adheres to the drum, a doctor blade 58 may be provided as shown to strip away the coated product. The drum 50 also serves to balance the effect on the electrical field of the metal mass of the hopper 10 which otherwise tends to attract the charge spray of coating material upwardly.

The entire metal structure is earthed in order to discharge possible eddy currents.

The coated product is collected in a trough or funnel 60 which is disposed beneath the drum 50 and may have internal helical vanes 62 or be otherwise adapted to cause circulation of the product during its descent through the funnel from which the product is discharged onto a conveyor belt 64.

Inclined shrouds 66 along the sides of the conveyor 64 prevent spillage of the product therefrom. Circulation of the product causes the coated particles to rub against each other other, thus distributing the coating substance over the surface of the product. The above described trough or funnel 60 has the advantage of no moving parts but where considerable circulation is required for homogenisation of the product a rotary screw serving also to transport the product, may be used.

Figure 3:
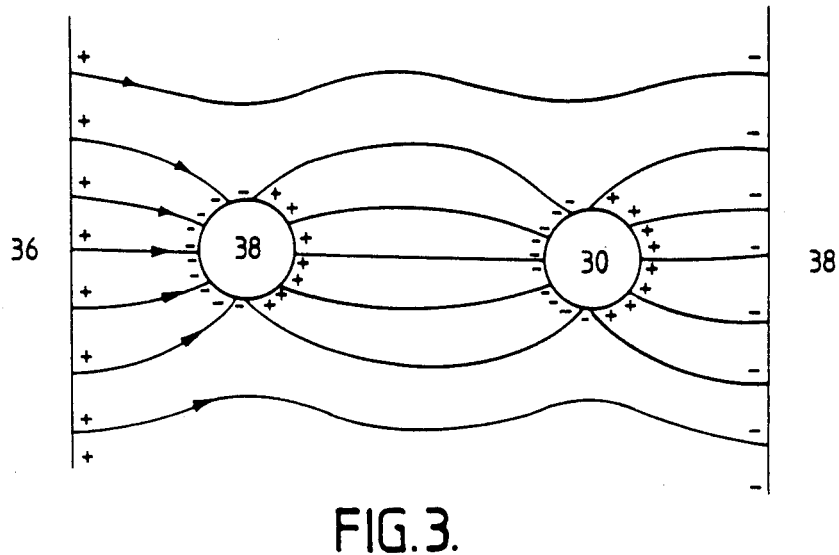
FIG. 3 is a diagram of the electrostatic field established in the apparatus of FIGS. 1 and 2 during spraying of conductive substances.
Figure 4:
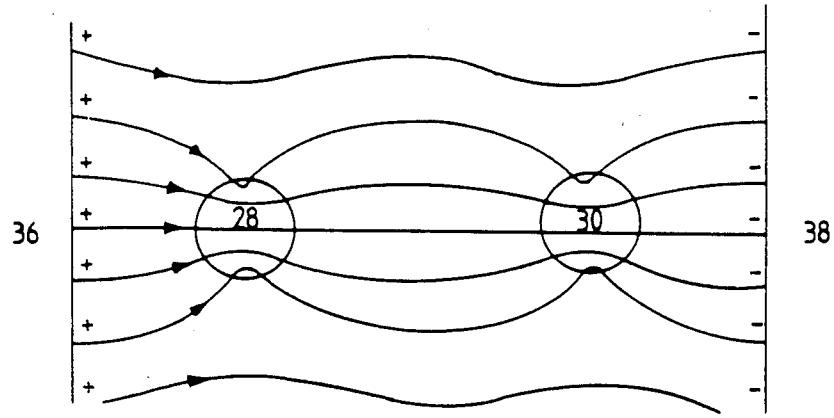
FIG. 4 is a diagram similar to FIG. 3 but for non-conductive substances.
Figure 5:
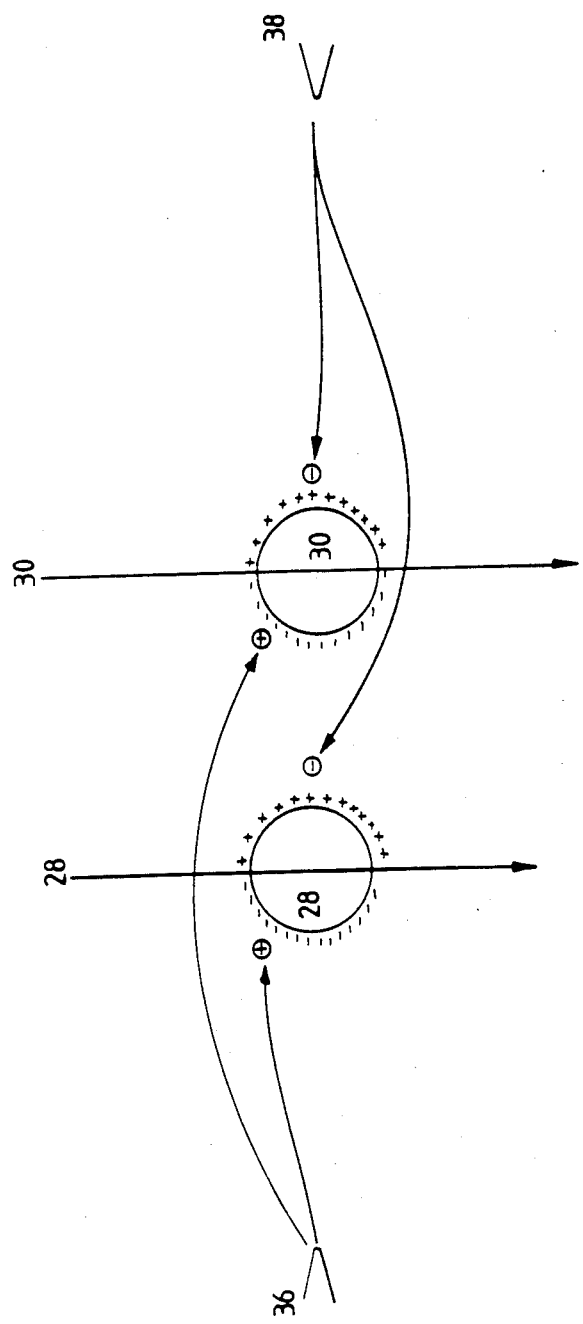
FIG. 5 is a diagram, illustrating the electrostatic attraction enabling the deposition of a complete coating around product particles in the apparatus of FIG. 1.

As will be seen from FIGS. 3 to 5, product particles which, in use of the apparatus described above, fall down freely in spaced parallel curtains 28 and 30 between opposed atomisers and/or diffusers 36 and 38, gain either by induction (FIG. 3) or by polarisation (FIG. 4) a negative charge on a side thereof closest to the positively charged spraying device 36 and a positive charge on the side closest to the other negatively charged spraying device 38. Thus any negatively charged coating material penetrating the curtain 30 is both repelled by the charged product particles in the curtain 30, and attracted toward the positively charged right side of product particles in the curtain 28. Positively charged coating material is applied to the left hand side of particles in the curtain 30 in similar manner.

Figure 6:
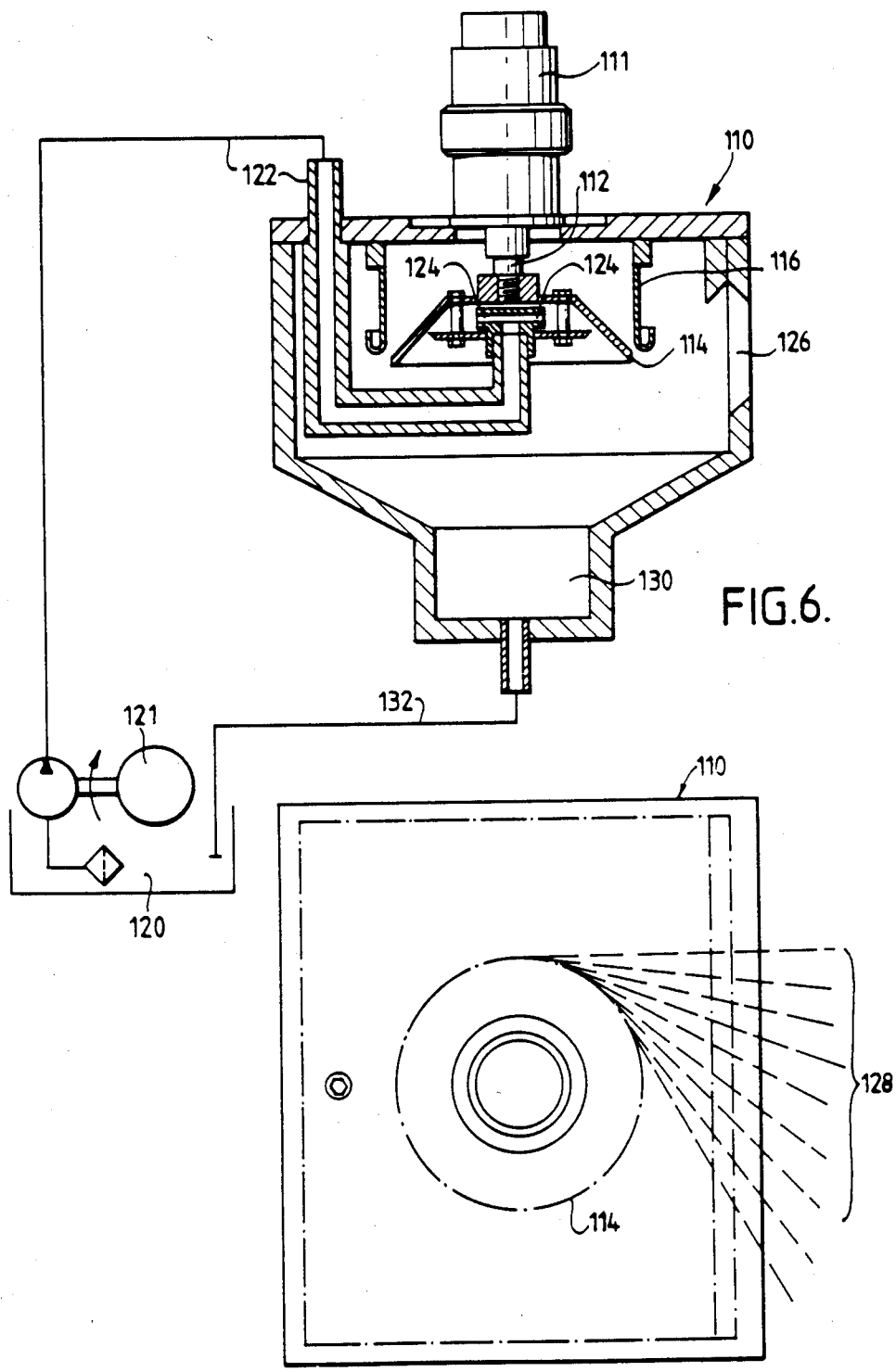
FIG. 6 is a cross-section of one embodiment of liquid atomiser suitable for use in the apparatus of FIGS. 1 and 2.

The liquid atomiser of FIG. 6 comprises a housing 10 on which is mounted a variable speed motor 111, the output shaft 112 of which extends downwardly into the housing 110 and has mounted for rotation therewith an inverted dished disc 114 arranged within a cylindrical skirt 116. Liquid is pumped from a reservoir 120 having a level control 121, along an inlet pipe 122 communicating with transverse passages 124 from which liquid is delivered onto the underside surface of the disc 114 rotating at high speed. Due to the action of centrifugal force, liquid spreads over the disc and is shed in a finely divided spray from all around the peripheral edge of the disc in a plane generally normal to the axis of rotation of the disc.

In one side of the housing is an outlet slot 126 through which a portion of the finely divided spray 128 issues from the housing. The remainder of the spray collides with the interior of the housing and drains into a sump 130 at the bottom of the housing 110, the pump 130 being connected by a pipe 132 to return unused liquid to the reservoir 120.

It will be understood that the direction of the spray can be adjusted by adjusting the position of the housing and that the angular extent or field of the spray depends upon the length of the outlet slot 126 which, if desired, may also be made adjustable, such that the field of spray may be restricted as required; in the apparatus of FIGS. 1 and 2, to the width of the free falling curtains 28 and 30.

As described above with reference to FIGS. 1 and 2, the electrostatic spray devices 36 and 38 are connected respectively to high voltage sources of opposite polarity.

When the spraying devices are liquid atomisers such as shown in FIG. 6, the electrical connection is made to the shaft 112 of the driving motor 111 such that the disc 114 carried by the shaft is at a high electrical potential of the appropriate polarity. Hence, the finely divided spray shed from the disc carries a corresponding positive or negative charge.

To avoid dispersion of the electrostatic charges, the housing 111 is best made of electrically non-conductive material.

What is claimed is:

1. A method for electrostatic application of a coating material on a product to be coated which product may be either of electrically conducting or non-conducting material, comprising causing the product to descend in free fall in the form of spaced curtains across two streams of electrostatically charged coating material directed laterally of the curtains from opposite sides thereof, wherein the two streams are charged with opposite polarity and such that an electrostatic charge opposite to that of the stream is imparted to that side of each of the two curtains towards which the stream is directed causing attraction between coating material and the product.

2. A method according to claim 1 wherein the two streams are directed in mutually opposite directions.

3. A method according to claim 1 or claim 2 wherein the coated product is electrically discharged by disposig an earthing element in the path of the free falling curtains.

4. Apparatus for electrostatic application of a coating material on a product to be coated which product may be of either electrically conducting or electrically non-conducting material comprising a feeding device from which in use, the product is caused to descend in free fall in the form of spaced curtains, two electrostatic spraying devices arranged below the feeding device to direct streams of electrostatically charged coating material laterally of the free falling curtains from opposite sides thereof, the spraying devices being adapted respectively for connection to high voltage sources of opposite polarity, whereby, in use, a different electrostatic charge is applied to each of the two streams of coating material and an electrostatic charge opposite to that of the stream is imparted to that side of each of the two curtains towards which the stream is directed causing attraction between the coating material and the product.

5. Apparatus according to claim 4 wherein the feeding device comprises a hopper having spaced outlet openings arranged such that in use the product is caused to fall freely in the form of two parallel and equal curtains.

6. Apparatus according to claim 5 wherein the openings are adjustable to vary the product flow rate and/or the distance between the curtains.

7. Apparatus according to claim 5 or claim 6 comprising means for vibrating the hopper.

8. Apparatus according to claim 4 wherein the spraying devices are arranged opposite one another such that the streams are mutually opposed.

9. Apparatus according to claim 4 and comprising an earthing element disposed in the path of the free falling coated product such that the coated product falls thereon and is electrically discharged.

10. Apparatus according to claim 9 wherein the earthing element is a rotatable drum provided with a doctor blade arranged to strip away any coated product adhering thereto.

11. Apparatus according to claim 10 wherein the rotatable drum is adjustably mounted in the chamber for varying the distance between the spraying devices and the drum.

12. Apparatus according to claim 11 wherein the drum is driven by a motor having a fixed mounting and connected for driving the drum by a drive shaft incorporating a universal joint.

13. Apparatus according to claim 10 wherein the drum is driven by a variable speed motor.

14. Apparatus according to claim 10 comprising baffles disposed along each side of the drum so as to restrict the spread of the coating material.

15. Apparatus according to claim 4 wherein each electrostatic spraying device comprise a housing having mounted therein a rotary disc onto which coating material is delivered such that the coating material is shed from a peripheral portion of the disc in a plane transverse to the free falling curtains, the housing having one or more outlet openings arranged such that the spray of coating material emerging from the housing is restricted to a predetermined angle of rotation.

* * * * *